United States Patent [19]
Parker et al.

[11] Patent Number: 5,835,808
[45] Date of Patent: Nov. 10, 1998

[54] VEHICULAR CAMERA MOUNT

[76] Inventors: Peter W. Parker, P.O. Box 1276, Port Aransas, Tex. 78373; Alton C. Bryan, P.O. Box 594, Ballinger, Tex. 76821

[21] Appl. No.: 996,322

[22] Filed: Dec. 22, 1997

[51] Int. Cl.$^6$ ..................................................... G03B 17/00
[52] U.S. Cl. ........................................... 396/419; 396/428
[58] Field of Search ................................... 396/419, 427, 396/428; 352/132, 243; 248/208

[56] References Cited

U.S. PATENT DOCUMENTS

| | | | |
|---|---|---|---|
| 3,833,196 | 9/1974 | Protzman | 248/208 |
| 4,615,597 | 10/1986 | Burris | 396/428 |
| 4,863,130 | 9/1989 | Marks | 248/206.3 |
| 4,933,691 | 6/1990 | Leslie | 396/427 |
| 5,039,050 | 8/1991 | Eidschun | 248/279.1 |
| 5,055,864 | 10/1991 | Slikkers | 396/428 |
| 5,246,193 | 9/1993 | Faidley | 248/206.3 |
| 5,260,731 | 11/1993 | Baker | 396/428 |

OTHER PUBLICATIONS

Kirk Enterprises —Camera mount Model WM–1, (no date).
L.L. Rue —Camera mount Groofwin Pod #E165A and #165B, (no date).

*Primary Examiner*—Eddie C. Lee
*Attorney, Agent, or Firm*—G. Turner Moller

[57] ABSTRACT

A vehicular camera mount is supported on the exterior of a vehicle door and includes a series of vacuum mounts adjacent the edge of the vehicle door. A horizontal beam comprising upper and lower horizontal supports connects the vacuum mounts. A vertical beam is mounted on the horizontal beam for horizontal adjustable movement and for vertical adjustable movement. A pair of clips stick into the window opening and connect to turnbuckles pulling the vertical beam toward the vehicle door. A pair of pads carried by the vertical beam abut the door and resist movement of the camera mount. A camera platform is carried by the vertical beam. The camera mount is sufficiently sturdy to hold a camera so steady that the only unintended movement of the camera is due to shaking or rocking of the vehicle. After being set up once to fit a particular vehicle, the camera mount can be taken off the door or installed on the door in less than two minutes.

12 Claims, 2 Drawing Sheets

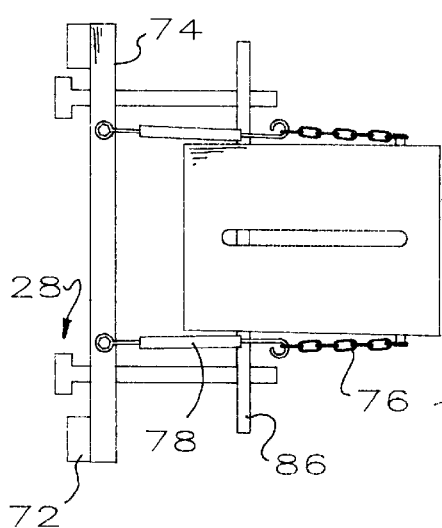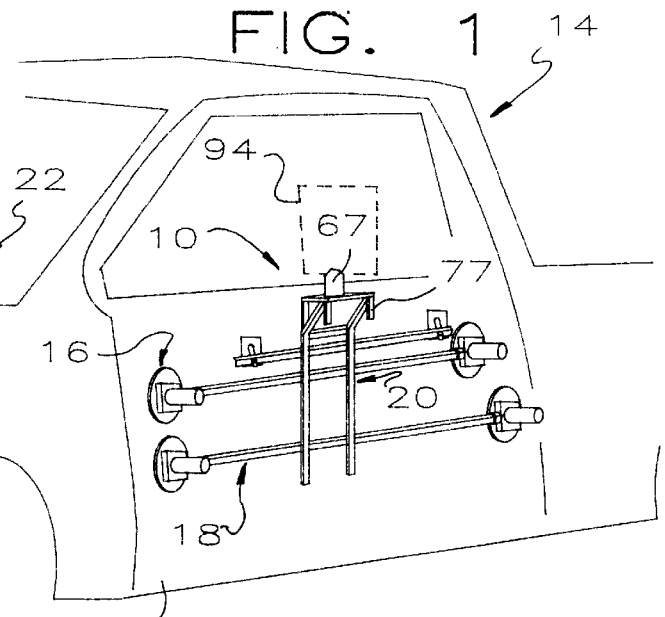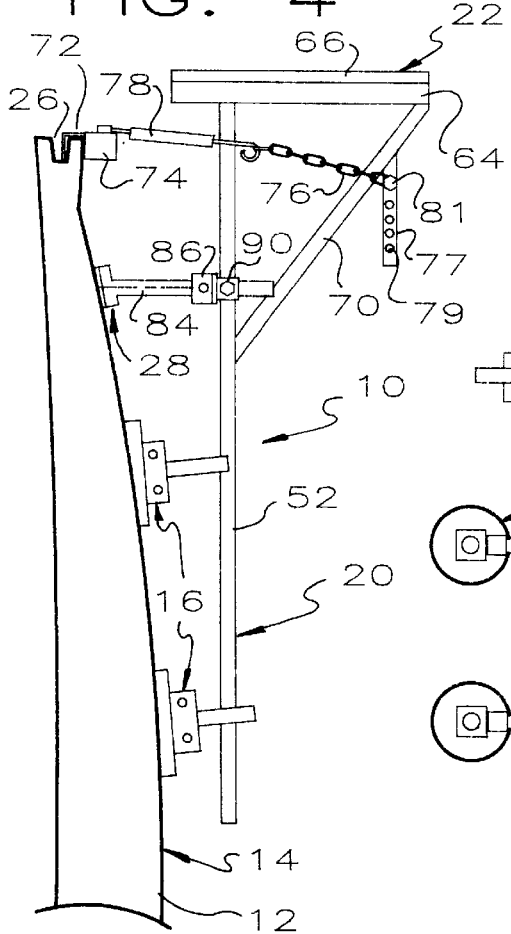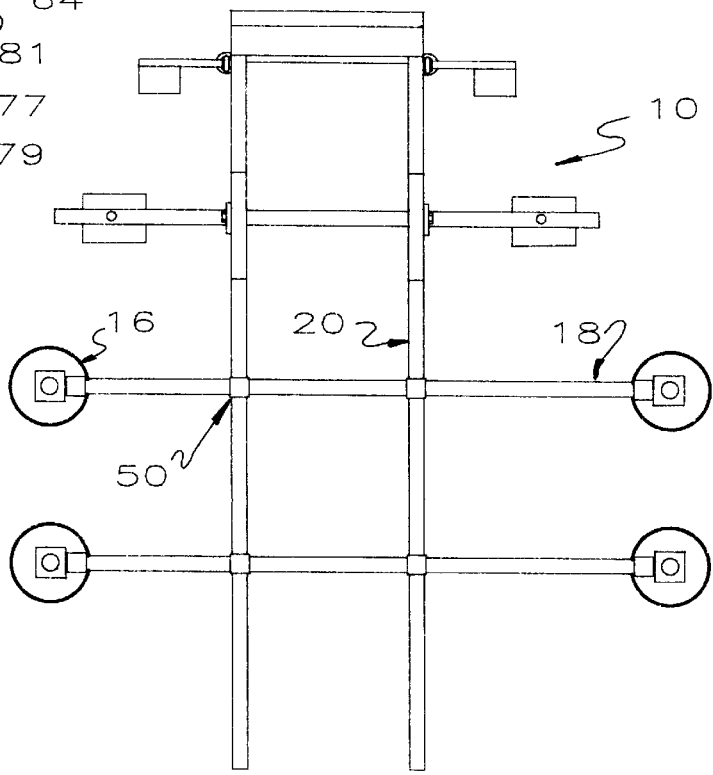

VEHICULAR CAMERA MOUNT

This invention is a mounting mechanism for supporting a camera on the door of a vehicle.

BACKGROUND OF THE INVENTION

Nature photography has recently become very popular and there is a significant market for professional photographers, both in motion pictures, video or still photography. In many parts of the world, a nature photographer sits in a vehicle and waits in a likely location for an interesting animal to approach within camera range. If nothing appears promising, the photographer will likely move to what is thought to be a more promising location.

Long range lenses are commonly used to provide close up views of animals in a variety of settings. One of the requirements of using a long range lens is the ability to keep the camera steady. Because of the long range lens, any movement of the camera is exaggerated so any slight jiggling produces a blurry, jumpy or otherwise unsalable picture. It is essentially impossible to hold a camera with a long distance lens and produce an acceptable video or photographic image. In response to this difficulty, a variety of vehicular camera mounts have been proposed, as shown in U.S. Pat. Nos. 3,833,196; 4,615,597; 4,863,130; 4,933,691; 5,039,050; 5,055,864 and 5,260,731.

It will suffice to say that none of the known vehicular camera mounts meet all of the requirements of a successful mount. The mount must be sufficiently stout to hold a camera and long range lens absolutely steady, have the capability of being attached and detached from the vehicle in a reasonable amount of time and be reasonably priced.

SUMMARY OF THE INVENTION

A vehicular camera mount of this invention attaches to the outside a door of a vehicle, such as the driver's door of a pickup truck. At least one, and preferably two, vacuum supports attach to each side of the vehicle door adjacent the door edge. A horizontal beam connects the vacuum supports. A vertical beam is adjustably mounted on the horizontal beam for horizontal and vertical adjustment. A platform is carried on the vertical beam and a camera is releasably attached to the platform. One or more clips fit into the window opening and provide purchase for turnbuckles pulling the vertical beam toward the door. A series of pads abuts the door and resists movement of the vertical beam toward the door. When assembled appropriately, a 150 pound adult human can stand on the platform without noticeable shifting of the mount. Shaking the mount sufficiently causes the vehicle to rock or shake but does not move the mount relative to the vehicle. After the mount is adjusted for a particular vehicle, it can be taken off and reattached in a simple, expeditious manner.

One of the problems with vehicle camera mounts is a requirement for great strength, much greater than might be expected. One technique promoting great strength is the use of vacuum mounts positioned near the edge of the vehicle door. Vehicle doors have been found to be much stronger near the edge than near the center. Another requirement of vehicle camera mounts is the ability to fit a wide variety of door sizes and shapes. In this invention, there are many points of adjustment of the various components of the camera mount so it can be adjusted to fit vehicles of greatly varying size and shape.

As used herein, camera is intended to mean a camera of any description, such as photographic, video, digital, motion picture or still cameras.

It is an object of this invention to provide an improved vehicular camera mount.

Another object of this invention is to provide a camera mount incorporating a series of vacuum supports adjacent the vertical edges of a vehicle door.

A further object of this invention is to provide an improved camera mount incorporating a horizontal beam connecting a series of vacuum supports on a vehicle door and a vertical beam vertically and horizontally adjustable on the horizontal beam.

These and other objects and advantages of this invention will become more apparent as this description proceeds, reference being made to the accompanying drawings and appended claims.

BRIEF DESCRIPTION OF THE DRAWINGS

FIG. 1 is a partial diagrammatic view of a vehicle equipped with a camera mount of this invention;

FIG. 3 is a top plan view of the camera mount of FIGS. 1–2;

FIG. 4 is a side elevational view of the camera mount of FIGS. 1–3;

FIG. 5 is a front elevational view of the camera mount of FIGS. 1–4;

DETAILED DESCRIPTION

Figure 2:
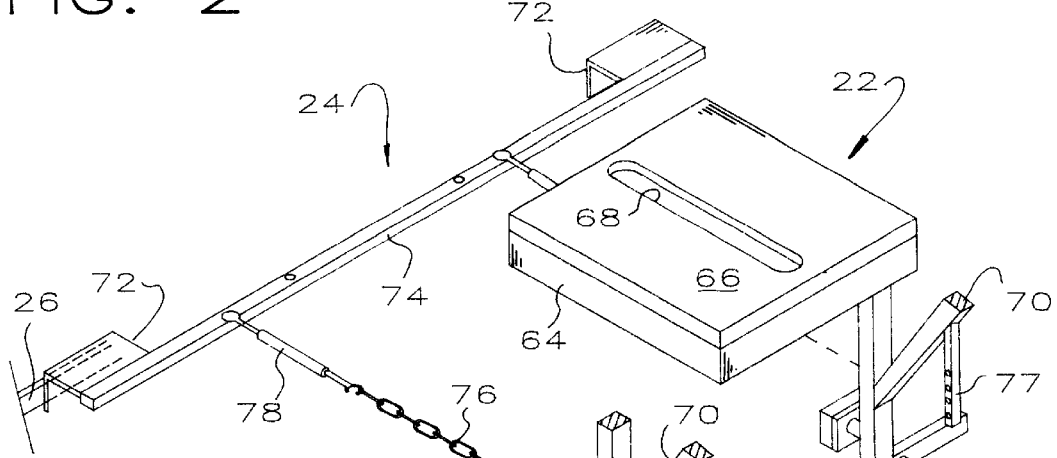
FIG. 2 is an exploded isometric of the camera mount of this invention.

Referring to FIGS. 1–7, a vehicle camera mount 10 of this invention is mounted on the exterior of a door 12 of a suitable vehicle 14, such as a pickup truck. The camera mount 10 comprises, as major components, a plurality of vacuum mounts 16, a horizontal beam 18 connected to the vacuum mounts 16, a vertical beam 20 connected to the horizontal beam 18, a camera platform 22 mounted on the vertical beam 20, an assembly 24 for grasping and pulling on the window opening 26 and a series of pads 28 abutting the vehicle door 12.

Figure 6:
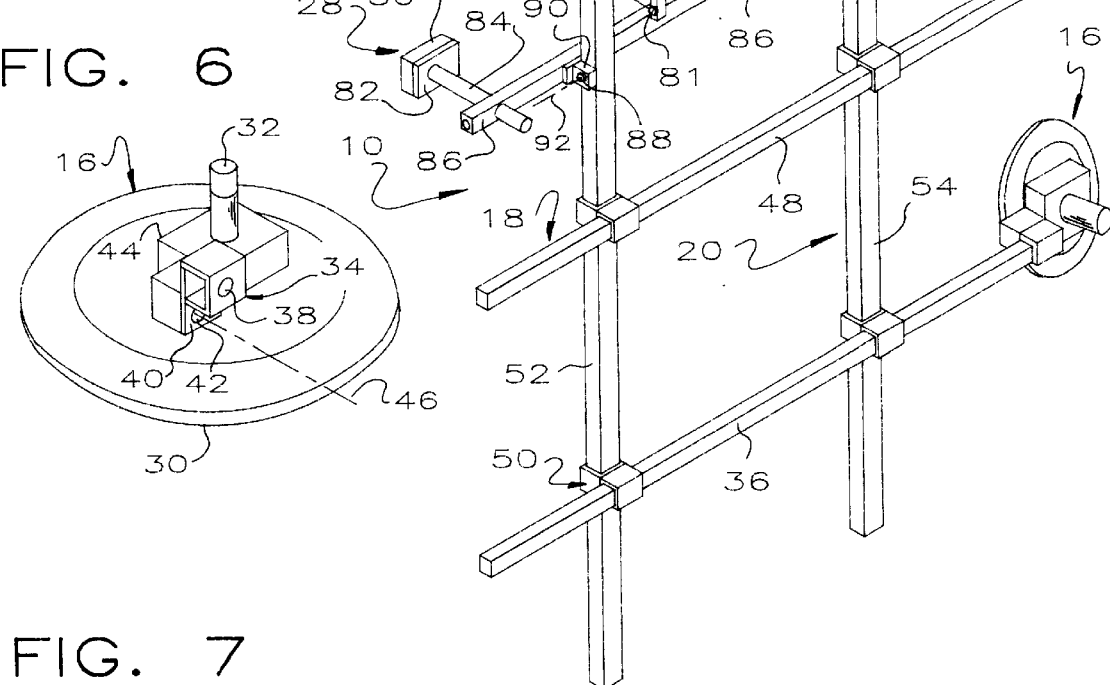
FIG. 6 is an isometric view of one of the vacuum supports.
Figure 7:
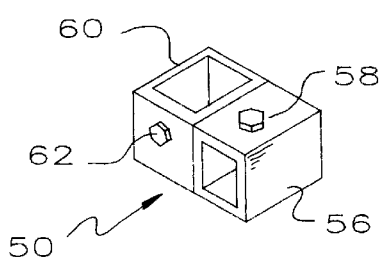
FIG. 7 is a closeup isometric view of one of the adjustable connectors used for securing a horizontal support to a vertical support.

The vacuum mounts 16 are shown more clearly in FIG. 6 and comprise a commercially available vacuum support having a flexible pad 30 for abutting the exterior of the door 12 and a pump actuator 32 which is repeatedly pushed in to draw a vacuum between the pad 30 and the door 12. Although a Model LJ6 Vacuum Support from Woods Power Grip, Laurel, Mont. has proved satisfactory, any suitable vacuum support may be used with this invention.

A suitable connector 34 is provided on the mount 16 for receiving an end of a horizontal support 36 comprising part of the horizontal beam 18. A set screw 38 or other suitable fastener connects the support 36 to the connector 34. The connector 34 includes an ear 40 connected by a fastener 42 to the frame 44 of the vacuum mount 16 so the connector 34 can be adjusted about an axis 46 defined by the fastener 42. This allows the vacuum mount 16 to be angularly adjustable relative to the horizontal support 36 which allows great flexibility in adjusting the camera mount 16 to the shape of the door 12.

The horizontal beam 18 comprises a lower horizontal support 36 and an upper horizontal support 48 joined by connectors 50 to side-by-side vertical supports 52, 54 comprising the vertical beam 20. The supports 36, 48, 52, 54 are conveniently square tubing but they may be round or any other suitable configuration. The connector 50 comprises a first support encircling section 56 having a set screw or other fastener 58 and a second support encircling section 60 having a set screw or other fastener 62. The sections 56, 60 provide openings compatible with the cross-sectional shape of the supports 36, 48, 52, 54 and the set screws 58, 62 bind the supports in place. It will be seen that making the horizontal beam 18 and the vertical beam 20 of two independent supports, great strength and great flexibility is provided.

The camera platform 22 comprises a peripheral frame 64 and a horizontal plate 66 welded into a rigid structure. An elongate opening 68 in the plate 66 allows a conventional camera ball head 67, such as a Bogun Model #3038, to be attached to the platform 22. Such conventional attachments include a threaded post (not shown) extending through the opening 68 and a wing nut (not shown) on the threaded post. The platform 22 is welded or otherwise secured to the upper ends of the vertical supports 52, 54. A pair of diagonal struts 70 are welded to the vertical supports 52, 54 and the platform 22.

The assembly 24 includes a pair of L-shaped members 72 extending into the window opening 26 and are connected adjacent opposite ends of a horizontal bar 74. Chains 76 and turnbuckles 78, or other suitable adjustable length tensioning device, connect the bar 74 to the vertical beam 20, conveniently adjacent to the diagonal struts 70. It is much preferred that some adjustment be provided to allow the chains 76 and turnbuckles 78 to be more-or-less horizontal at different vertical positions of the platform 22. To this end, a pair of generally vertical legs 77 are welded or otherwise secured to the diagonal struts. The legs 77 provide a series of vertical connections, such as openings 79 to receive a fastener 81 securing the adjustable length tensioning device to the vertical beam 20.

At least one pad 28, and preferably two, are provided on the vertical beam 20 for abutting the exterior of the door 12 and stabilizing the mount 10. The pads 28 each comprise a resilient face 80 bonded to a rigid backing 82 mounted on the end of a rod 84 connected to a bar 86. The bar 86 is connected to the vertical supports 52, 54 by fasteners 88 extending through ears 90. The bar 86 is accordingly mounted for pivotal adjustable movement about an axis 92 provided by the fasteners 88.

Installation, adjustment and use of the camera mount 10 should now be apparent. Initially, connectors 50 are slipped over the horizontal supports 36, 38, the horizontal supports are attached to the vacuum mounts 16 and the vacuum mounts 16 attached to the vehicle door 12, adjacent the edges. By putting the mounts 16 adjacent the edges of the door 12, maximum strength is provided because common vehicle doors 12 are much stronger adjacent the edge than adjacent the center. Any adjustment of the mount connector 34 about the axis 46 is accomplished during tightening of the fastener 42.

The assembly comprising the vertical beam 20 and the camera platform 22 is slipped into the connectors 50 and the set screws 58, 62 are tightened after raising the camera platform 22 to adjacent the bottom of the window opening 26. The L-shaped members 72 are inserted into the window openings 26 and the turnbuckles 78 are shortened until the pads 28 firmly abut the door 12, adjacent the upper end thereof. A camera 94 of any suitable description is then attached to the camera platform using a conventional ball head mount 67.

The camera mount 10 is very stable. In a prototype of the invention, as shown in the drawings, a medium sized adult can stand on the camera platform 22 without noticeable effect. The camera mount 10 is sufficiently stable that the vehicle 14 can be rocked by shaking the platform 22 and no other effect is apparent.

When it is desired to remove the camera mount 10, the camera is first removed and stowed. The turnbuckles 78 are loosened so the L-shaped members 72 can be removed from the window opening 26. The vacuum between the vacuum mount pads 30 is then broken, as by pulling up on an edge of the pad 30 with a fingernail while supporting the camera mount 10 with the other hand. The camera mount 10 is then loose from the vehicle door 12 and can be stowed in any suitable manner.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

We claim:

1. A vehicular camera mount for supporting a camera on a door of a vehicle, comprising a horizontal beam of a length to span a substantially part of the vehicle door and having at least one suction mount on each end of the beam adjacent an edge of the door;

a vertical beam and means mounting the vertical beam on the horizontal beam including means for adjusting the vertical beam in a horizontal direction along the horizontal beam;

an assembly for grasping the vehicle door including at least one L-shaped member for extending into a window opening provided by the door and an adjustable length tensioning device connecting the assembly and the vertical beam;

at least one pad carried by the vertical beam for abutting the door and resisting movement of the vertical beam toward the door in response to shortening the adjustable length tensioning device; and a camera platform carried by the vertical beam having means for connection to a camera.

2. The vehicular camera mount of claim 1 wherein the means mounting the vertical beam on the horizontal beam including means for adjusting the vertical beam in a vertical direction.

3. The vehicular camera mount of claim 2 wherein the horizontal beam comprises upper and lower horizontal supports, each of the supports having a suction mount adjacent an end thereof.

4. The vehicular camera mount of claim 3 wherein the vertical beam comprises side-by-side vertical supports and wherein the mounting means comprises a connector at each intersection of the horizontal and vertical supports.

5. The vehicular camera mount of claim 4 wherein each of the connectors comprises a first support encircling member around the horizontal support, a second support encircling member around the vertical support, a first fastener for fixing the first support encircling member to the horizontal support and a second fastener for fixing the second support encircling member to the vertical support.

6. The vehicular camera mount of claim 4 wherein the suction support comprises a flexible pad for abutting the vehicle door and means for applying a vacuum between the pad and the vehicle door thereby releasably fixing the support to the door.

7. The vehicular camera mount of claim 4 wherein the upper and lower horizontal supports are individually vertically adjustable, relative to each other, on the side-by-side vertical supports.

8. The vehicular camera mount of claim 7 wherein the side-by-side vertical supports are individually horizontally adjustable, relative to each other, on the upper and lower horizontal supports.

9. The vehicular camera mount of claim 4 wherein the assembly for grasping the vehicle door comprises a horizontal bar, the first mentioned L-shaped member being connected to the horizontal bar adjacent a first end thereof, and further comprising a second L-shaped member adjacent a second end of the horizontal bar, the adjustable length tensioning device connecting the horizontal bar adjacent the first end and the vertical supports and further comprising a second adjustable length tensioning device connecting the horizontal bar adjacent the second end and the vertical supports.

10. The vehicular camera mount of claim 9 wherein the adjustable length tensioning device is a turnbuckle.

11. The vehicular camera mount of claim 9 further comprising a generally horizontal strut under the camera platform and connected to the side-by-side vertical supports, the pad being mounted on the horizontal strut adjacent a first of the vertical supports and further comprising a second pad mounted on the horizontal strut adjacent a second of the vertical supports, the pads comprising a resilient face for abutting the door.

12. The vehicular camera mount of claim 4 wherein the assembly for grasping the vehicle door comprises a pair of spaced vertical legs on the platform providing a series of vertically spaced connections, the first mentioned adjustable length tensioning device removably attached to one of the connections on a first of the legs, and a second adjustable length tensioning device removably attached to one of the connections on a second of the legs.

* * * * *